United States Patent [19]

Chen et al.

[11] Patent Number: 5,287,496
[45] Date of Patent: Feb. 15, 1994

[54] DYNAMIC, FINITE VERSIONING FOR CONCURRENT TRANSACTION AND QUERY PROCESSING

[75] Inventors: Ming-Syan Chen; Kun-Lung Wu, both of Yorktown Heights; Philip Shi-lung Yu, Chappaqua, all of N.Y.

[73] Assignee: International Business Machines Corporation, Armonk, N.Y.

[21] Appl. No.: 661,046

[22] Filed: Feb. 25, 1991

[51] Int. Cl.⁵ ............................................. G06F 15/40
[52] U.S. Cl. ..................... 395/600; 395/700; 364/282.1; 364/283.1; 364/974; 364/DIG. 1
[58] Field of Search ............... 395/600, 700; 364/DIG. 1, DIG. 2

[56] References Cited

U.S. PATENT DOCUMENTS

| | | | |
|---|---|---|---|
| 4,558,413 | 12/1985 | Schmidt | 395/600 |
| 4,627,019 | 12/1986 | Ng | 395/425 |
| 4,631,673 | 12/1986 | Haas et al. | 364/300 |
| 4,646,229 | 2/1987 | Boyle | 395/600 |
| 4,714,992 | 12/1987 | Gladney et al. | 395/600 |
| 4,751,635 | 6/1988 | Kret | 395/600 |
| 4,769,772 | 9/1988 | Dwyer | 395/600 |
| 4,797,810 | 1/1989 | McEatee et al. | 395/425 |
| 4,814,971 | 3/1989 | Thatte | 395/575 |
| 4,819,159 | 4/1989 | Shipley et al. | 395/575 |
| 4,853,843 | 8/1989 | Ecklund | 395/600 |
| 4,875,159 | 10/1989 | Cary et al. | 395/600 |

OTHER PUBLICATIONS

Korth & Silberschatz, *Database System Concepts*, McGraw-Hill, (New York, 1986) pp. 380-385 389-402.
"Concurrent Control in Distributed Database Systems", Bernstein & Goodman *Computing Surveys*, vol. 13, No. 2, Jun. 1981, pp. 185-221.
IBM Technical Disclosure Bulletin; vol. 31, No. 1; Jun. 1988; Elimination of Lock Contention in Relational Databases Accessed by Read-Only Queries and On-line Update Transactions, pp. 180-185.
Michael Carey et al., The Performance of Multiversion Concurrency Control Algorithms; ACM Transactions on Computer Systems, vol. 4, No. 4; Nov. 1986; pp. 338-379.
Mukesh Singhal et al., A Concurrency Control Algorithum and its Performance for Replicated Database Systems; IEEE, 1986; pp. 140-147.

(List continued on next page.)

*Primary Examiner*—Thomas C. Lee
*Assistant Examiner*—Paul Lintz
*Attorney, Agent, or Firm*—Whitham & Marhoefer

[57] ABSTRACT

A dynamic, finite versioning scheme supports concurrent transaction and query processing in which there is no interference between transactions and queries and no quiescence of either transactions or queries for allowing queries to access a more up-to-date database. Only a finite number of logical versions are dynamically maintained on disk for a database page. Acquiring no locks, queries access appropriate query versions, according to their initiation times. Each corresponding query version of all the database pages constitutes a transaction-consistent, but perhaps slightly out-of-date, database snapshot. Through typical concurrency control mechanisms, different transactions access the most up-to-date versions, and their updates are allowed to be incrementally written into the database before they are committed. To save storage, a physical page copy may simultaneously represent multiple versions. The exact logical version(s) that a physical page copy represents changes dynamically and implicitly. A new mechanism using time-invariant and time-varying data structures is introduced to define query snapshots, to facilitate a new query snapshot to be taken without interrupting either the transaction or query processing, to identify dynamically appropriate versions for transaction and query accesses, and to allow efficient, on-the-fly garbage collection when it is recognized that only a single page copy is sufficient to represent the required logical versions.

28 Claims, 8 Drawing Sheets

OTHER PUBLICATIONS

Shojiro Muro et al. Multi-Version Concurrency Control Scheme for a Database System; Journal of Computer & System Sciences; vol. 29, No. 2, Oct. 1986; pp. 207–226.

William E. Weihl; Distributed Version Management for Read-Only Actions; IEEE Transactions on Software Engineering; vol. SE-13, No. 1, Jan. 1987; pp. 55–64.

Toshimi Minoura et al., Version-Based Access Capabilities for Concurrency Control of a Database System; Pro. Int. Conf. on Data Engineering; 1984 pp. 300–306.

Sang Hyuk Son; Using Replication for High Performance Database Support in Distributed Real-Time Systems; IEEE; Proc. Real-Time Systems Symp, 1987 pp. 79–86.

R. Bayer et al., Parallelism and Recovery in Database Systems; ACM Transactions on Database Systems; ACM Transactions on Database Systems, vol. 5, No. 2, Jun. 1980; pp. 139–156.

Arvola Chan et al., The Implementation of an Intergrated Concurrency Control and Recovery Scheme, ACM 1982; SIGMOD; Proc. Inter. Conf. on Management of Data; pp. 184–191.

Arvola Chan et al., Implementing Distributed Read-Only Transactions; IEEE Transactions on Software Engineering; vol. SE-11, No. 2, Feb. 1985; pp. 205–212.

David P. Reed, Implementing Atomic Actions on Decentralized Data; ACM Transactions on Computer Systems, vol. 1, No. 1, Feb. 1983; pp. 3–23.

Richard E. Stearns, Distributed Database Concurrency Controls Using Before-Values; Proc. ACM—SIGMOD, 1987; Int. Conf. on Management of Data; pp. 74–83.

DYNAMIC, FINITE VERSIONING FOR CONCURRENT TRANSACTION AND QUERY PROCESSING

BACKGROUND OF THE INVENTION

1. Field of the Invention

The present invention generally relates to a concurrent transaction and query processing system and, more particularly, to a dynamic, finite versioning scheme in which there is no interference between transactions and queries and no quiescence of either transactions or queries for allowing queries to access a more up-to-date database. The new mechanism uses time-invariant and time-varying data structures to define query snapshots, to facilitate a new query snapshot to be taken without interrupting either the transaction or query processing, to identify dynamically appropriate versions for transaction and query accesses, and to allow efficient, on-the-fly garbage collection when it is recognized that only a single page copy is sufficient to represent the required logical versions.

2. Description of the Prior Art

In concurrent transaction and query processing environments, only transactions may potentially update the database while queries are read-only actions. Largely supporting decision making, queries do not necessarily have to access the most up-to-date database, as long as they access a transaction-consistent database. By maintaining multiple versions of data objects, the interference between transactions and queries can be eliminated: transactions create new versions and queries access old versions. See, for example, David P. Reed, "Implementing Atomic Actions on Decentralized Data", *ACM Trans. on Computer Systems*, vol. 1, no. 1, pp. 3-23, February 1983; A. Chan, S. Fox, W. -T. K. Lin, A. Nori, and D. R. Ries, "The Implementation of An Integrated Concurrency Control and Recovery Scheme", *ACM SIGMOD Proc. Int. Conf. on Management of Data*, pp. 184-191, 1982; A. Chan and R. Gray, "Implementing Distributed Read-Only Transactions", *IEEE Trans. on Software Engineering*, vol. SE-11, no. 2, pp. 205-212, February 1985; W. E. Weihl, "Distributed Version Management for Read-Only Actions", *IEEE Trans. on Software Engineering*, vol. SE-13, no. 1, pp. 55-64, January 1987; and P. A. Bernstein, V. Hadzilacos and N. Goodman, *Concurrency Control and Recovery in Database Systems*, Addison-Wesley, 1987.

In existing approaches using multiversioning as described in the Bernstein et al. text cited above, every transaction creates a new version of a data object and the old versions of the data object are kept for potential query accesses. At any given instant, there might be a large, unlimited number of versions maintained for a data object. As a result, although the interference is eliminated, the problems of storage overhead (for maintaining a potentially unlimited number of old versions) and version-management complexity (for version retrieval and garbage collection) can be severe.

Various multiversioning schemes have been proposed to achieve a higher level of concurrency. In addition to the articles by Reed, Chan et al. and Weihl et al. cited above, see also R. Bayer, H. Heller and A. Reiser, "Parallelism and Recovery in Database Systems", *ACM Trans. on Database Systems*, vol. 5, no. 2, pp. 139-156, June 1980, and R. E. Sterns and D. J. Rosenkrantz, "Distributed Database Concurrency Control Using Before-Values", *Proc. of ACM SIGMOD Int. Conf. on Management of Data*, pp. 74—83, 1981. Bayer et al. and Stearns et al. have proposed multiversion concurrency protocols using two versions. Interference between read-only queries and update transactions is reduced, but not eliminated. The increase in the level of concurrency is limited, for only a single old version is maintained and read-only queries may still compete with update transactions through special locking protocols.

Interference between update transactions and read-only queries can be eliminated by maintaining a possibly unlimited number of versions for a data object. Reed, cited above, has proposed a scheme which works conceptually by keeping forever every version created. Garbage collection was not well addressed and read-only queries may have to be aborted if certain old versions that they need are no longer available. Chan et al., cited above, have developed a version management technique using a ring buffer as the version pool, storing old versions. When the ring buffer overflows, some old versions have to be discarded to make room for versions to be updated by transactions, causing queries to be aborted. The possibility of aborting a read-only query due to an early garbage collection can be eliminated by a scheme developed by Weihl, also cited above. However, it is achieved at the cost of imposing a complex, expensive initiation phase for query execution in which, before it can start accessing any database object, a query has to ensure that all the versions that it needs are available and registered to prevent interference from early garbage collection.

SUMMARY OF THE INVENTION

It is therefore an object of the present invention to provide a database system that effectively and efficiently supports concurrent transaction and query processing.

It is another and more specific object of the invention to provide a database system which supports concurrent transaction and query processing with a dynamic, finite versioning approach that allows queries to access a more up-to-date database and makes efficient use of storage.

It is yet another object of the invention to provide a database system wherein, at any instant, at most a fixed, finite number of logical versions of a data page are dynamically maintained on disk storage.

According to the invention, the dynamic, finite versioning approach supports concurrent transaction and query processing in which there is no interference between transactions and queries and no quiescence of either the transactions or queries for allowing queries to access a more up-to-date database. At any instant, at most a fixed, finite number of logical versions for a data page are dynamically maintained on disk. For example, in addition to the most recently committed version and the working version, a dynamic 4-versioning scheme maintains two query versions while a dynamic 5-versioning scheme maintains three query versions. Without locking, queries access appropriate query versions, according to their initiation times. Each corresponding query version of all the database pages represents a transaction-consistent database snapshot. The most recently committed version is ready, at any moment, to be snapshot to become a new query version without interrupting either the transaction or query processing. Through typical concurrency control mechanisms, transactions access the most up-to-date version and are allowed to write their updates into the database on disk before they are committed.

Unlike traditional multiversioning approaches, in which an unlimited number of older versions for each page may be maintained for read-only queries, our dynamic, finite versioning schemes support concurrent transaction and query processing by maintaining only finite versions. As a result, storage overhead and version-management complexity are significantly reduced.

To save even more storage, a physical copy of a page may simultaneously represent multiple logical versions, and it can be dynamically expanded into multiple copies as necessary. In addition, updates by a new transaction overwrite pages of obsolete versions. The exact version(s) that a physical page copy represents changes dynamically and implicitly, and is subsequently recognized by dynamic version identification when the page is referenced. A new mechanism using time-invariant and time-varying data structures has been developed to define query snapshots, to facilitate a new query snapshot to be taken without interrupting either the transaction or query processing, to identify dynamically and rapidly appropriate versions for transaction and query accesses, and to allow efficient, on-the-fly garbage collection when, during a normal read access to a page, it is recognized that only a single page copy is sufficient to represent the required logical versions.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

For purposes of the description of the invention, it is assumed that the transaction/query manager, or scheduler, knows whether a request is from an update transaction or read-only query. A concurrency control mechanism, such as two-phase locking or time stamp ordering, is assumed to maintain a serializable order for different update transactions, with a page as the granularity of concurrency control between transactions. A "page" is a defined unit of space on a storage medium and contains one or more records. For many computers, a page is 1024 bytes, where a byte is the number of bits required to represent a single character (typically eight bits). However, in the description of the present invention, the term "page" may be any arbitrary block of data. In the practice of the invention, there is no synchronization between queries and transactions, or among different queries.

In the following description of the invention, the requirements for an effective concurrent transaction and query processing environment are first described. Based on these requirements, a dynamic 4-versioning scheme which satisfies all the requirements is presented. Query snapshot mechanisms and dynamic version identification algorithms are introduced. Finally, some implementation alternatives, such as dynamic, finite versioning using more than four versions or less than four versions and the management of long-running queries are discussed.

Initially, the important features of a system that effectively supports concurrent transaction and query processing are identified as follows.

No Interference: The first requirement of effectively supporting concurrent transaction and query processing is no interference of any form between read-only queries and update transactions. The first, and the most obvious, interference is the blocking of queries by transactions or the blocking of transactions by queries. To eliminate such interference, queries should not place any locks on the data objects they access. The second interference is the requirement of a quiescence of transactions and/or queries for allowing queries to access a more up-to-date database. The third interference is the forced abort of long-running queries due to early garbage collection to make room for transaction updates.

Near Up-to-Dateness for Query Accesses: An important requirement for concurrent transaction and query processing is that queries should read a near up-to-date database. A naive approach without any interference between transactions and queries is to allow queries to access the initial database. Alternative to this naive approach is to periodically make a copy of the entire database, during which no transactions or queries can access the database. Since copying the entire database takes a long time, it cannot be performed frequently. As a result, queries may read a substantially obsolete database state, and thus provides less useful results.

Efficient Version Management: Efficient version management includes effective storage utilization for maintaining old versions, rapid version retrieval for transactions and queries, and efficient garbage collection. If the number of versions maintained for a data object can be unlimited, version management is complex and expensive, especially garbage collection is difficult to implement. By maintaining at most a fixed, limited number of versions, efficient version management becomes possible.

No Physical Copying of Before-Images: In traditional multiversioning approaches, the before-image of a page is copied to a working area before a new transaction update can be written into the database. As illustrated in the performance evaluation of multiversion concurrency control algorithms described by M. J. Carey and W. A. Muhanna in "The Performance of Multiversion Concurrency Control Algorithms", *ACM Trans. on Computer Systems*, vol. 4, no. 4, pp. 338–378, November 1986, such a cost for copying before-images causes the transaction performance of multiversion algorithms to be worse than that of single-version algorithms.

Incremental Write-backs: Updates by an uncommitted transaction should be allowed to be written back to the database, since most buffer-management schemes require the replacement of dirty pages from the buffer before a transaction is committed.

No Separate Indices for Transaction and Query Accesses: Since queries will read the near up-to-date database and the database is evolving as transactions continue updating it, rebuilding a new index for query accesses is frequently required if a separate index is maintained for queries.

Figure 1:
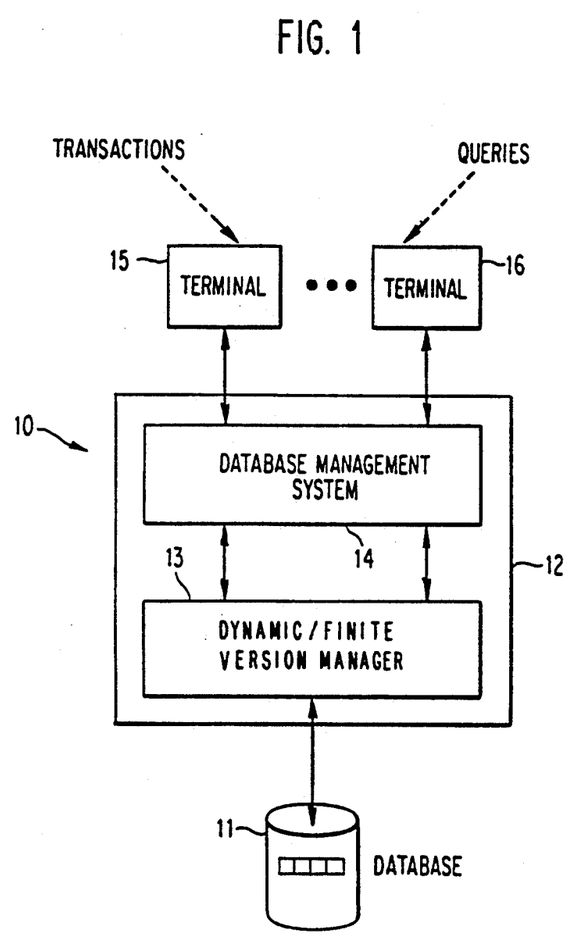
FIG. 1 is a block diagram of a database system employing dynamic, finite versioning according to the invention.

Having identified the important features for supporting concurrent transaction and query processing, the dynamic, finite versioning approach that satisfies all the features and maintains at most four versions for a database page will now be described. The database system which implements the invention is shown in FIG. 1. The system 10 comprises a database 11, a processor (Central Processing Unit (CPU) and Memory) 12 which stores and executes a version manager 13 and a database management system 14, and a plurality of terminals 15 and 16. The processor 12 may contain a single CPU or multiple CPUs. The database 11 is typically stored on a plurality of Direct Access Storage Devices (DASDs), although only one such device is illustrated in FIG. 1. These DASDs may be, for example, disk packs, and it will be understood by those skilled in the data processing arts that the system includes the required DASD controllers and channels that establish the communication between the database 11 and processor 12. Further, as illustrated in FIG. 1, the terminals are Input/Output (I/O) devices for accepting requests from and returning results to the users. Transactions and queries are submitted from the terminals and are processed concurrently by the database management system 14. Multiple versions of database pages are maintained in the database by using the dynamic, finite versioning approach according to the invention, as described in more detail below. By using the dynamic version identification routines of the invention, the version manager 13 returns to the database management system 14 correct versions of concurrent transaction and query processing.

In the dynamic 4-versioning scheme of this invention, at most four versions for a database page are managed on disk, including the most recently committed version (hereinafter sometimes referred to as the next query version), the working version and two query versions. At any instant, the two query versions of all the database pages represent two transaction-consistent, but perhaps slightly out-of-date, database snapshots: the current query snapshot and the previous query snapshot. Without any interference from queries, transactions access the current database, and their updates can be written into the database before they are committed. These uncommitted updates produce the working version pages, and the working version pages become immediately the most recently committed version pages when the updating transactions are committed. Queries, on the other hand, access the database from appropriate query snapshots according to the initiation time-stamps of the queries and the time stamps of the query snapshots. Queries issued before the current query snapshot read from the previous query snapshot, while queries issued after the current query snapshot read from the current query snapshot. The most recently committed version pages are ready, at any moment, to be snapshot to become a new current query snapshot for subsequently arriving queries. When there is no active query accessing it, a query snapshot advances automatically in real time without interrupting either the transaction or query processing.

Although there are up to four logical database versions for each page, the implementation does not require a disk space of size four times as large as that of a single-copy database: a physical page copy may simultaneously represent multiple logical versions of the page. Initially, there is only a single copy for each database page. When a database page is actively updated, up to three additional physical page copies can be dynamically created. On the other hand, if a page has not been updated for a long period of time, only a single page copy may be sufficient to maintain the required logical versions. Because at most four versions are maintained for each database page, when an update to a page is written into the database, one of the obsolete versions may be overwritten. The rule for overwriting is to keep three database versions intact: the most recently committed version and two query versions.

Due to dynamic transaction overwrites and automatic query-snapshot advancements, the exact version(s) that a physical page copy represents changes dynamically. The version changes (or transitions), however, are implicit and are subsequently recognized by dynamically identifying correct versions for transaction and query accesses. A new mechanism using data structures to distinguish the invariant, including the update time of physical page copies and the transaction identifier that created a page copy, from the variant, which is the system state, including query snapshot times and active transactions and queries at a given time, has been developed as part of this invention to achieve dynamic version identification and automatic query-snapshot advancements.

Physical storage for storing multiple versions for a database page is dynamically managed. When an update for a page is received and only a single page copy is maintained for the page, three physically contiguous, free pages on the same track or on a nearby track are allocated at one time. The update is written into one of the three newly allocated pages and the original copy remains intact. This newly created page copy is a working version page before the updating transaction is committed and becomes the most recently committed version after the updating transaction is committed. These three additional pages together can be subsequently deallocated if the logical pages all become merged into and represented by a single physical page, which happens when a page has not been updated for a period of time. The three-at-one-time allocation and deallocation strategies are designed for simplifying the storage management and for better preserving the sequentiality of the database. Alternatively, only a single free page can be allocated when it is required.

For efficient version management, three arrays are maintained: a page mapping array pm[ ], a time-stamp array tt[ ] and a transaction-identifier array tid[ ]. The data structures, expressed in Cpseudo code, for pm[ ], tt[ ] and tid[ ] are as follows:

```
struct pm_entry {
    next_page: int; /* next physical page for this
        logical page */
```

-continued

```
order[4]: int; /* time stamp ordering of the
    four versions */ } pm[M];
tt[N]: int; /* time at which a physical page is
    updated */
tid[N]: int; /* identifier of the transaction
    updating a page */
```

The size of the page mapping array is M, the total number of logical pages, but the sizes of the time-stamp and transaction-identifier arrays are both N, the total number of physical pages. Each entry of the page mapping array maintains a pointer to the address of the first of the three additional pages, and the time-stamp ordering of the four versions of a database page in such a way that pm[i].order[0] records the address of the page storing the most recently updated version and pm[i].order[3] points to the least recently updated version. The time-stamp array records the time at which a physical page is updated, while the transaction-identifier array maintains the identifier of the transaction last updating a page. Notice that, tt[ ] and tid[ ] are used to maintain the invariant, which is fixed and will not change once a page copy is created. However, pm[i].order[ ] is designed for efficiently recognizing the update order of different versions for a page; alternatively, we can dynamically identify the update order every time when the page is referenced.

The time-invariant information is maintained with each physical page copy when it is created, but the time-varying information about the system state is maintained in memory, eliminating the requirement of extra disk accesses to page copies when the system state changes. In this section, we present data structures, using time stamps, active transaction lists and active query lists, for maintaining the time-varying system state, and the manipulation of the data structures to facilitate automatic query-snapshot advancements.

When a transaction is started, its identifier is recorded in the current active transaction list, AcTL$_{cur}$, and is removed from the current active transaction list when it is committed. When a page is updated on disk by a transaction, the real time of its update and the transaction's identifier are recorded for the page. Notice that, unlike traditional time-stamping approaches, it is not the transaction initiation time or the transaction commit time, but the page update time, that is recorded. AcTL$_{cur}$ and the recorded transaction identifier on each physical page copy are used to decide whether or not a page copy represents a committed version.

Two transaction-consistent database snapshots are maintained: the current query snapshot and the previous query snapshot. A query snapshot is defined by a time stamp and an active transaction list at the time when the snapshot was taken. The current query snapshot is the database snapshot taken at time $t_{cqs}$, and is defined by $t_{cqs}$ and AcTL$_{cqs}$, the active transaction list at time $t_{cqs}$. Similarly, the previous query snapshot is the database snapshot taken at time $t_{pqs}$, and is defined by $t_{pqs}$ and AcTL$_{pqs}$, the active transaction list at time $t_{pqs}$.

Also associated with each query snapshot are two active query lists: QL$_{cqs}$ is the active query list accessing the current query snapshot, and QL$_{pqs}$, is the active query list accessing the previous query snapshot. To begin a query, it is assigned a time stamp of its initiation time and its identifier is included in QL$_{cqs}$. When a query is completed, its identifier is deleted from either QL$_{cqs}$ or QL$_{pqs}$. With their identifiers in QL$_{cqs}$, queries initiated after $t_{cqs}$ read the database from the current query snapshot; these queries read the version of a page updated by the latest transaction committed before $t_{cqs}$. On the other hand, with their identifiers in QL$_{pqs}$, queries initiated between $t_{pqs}$ and $t_{cqs}$ read the database from the previous query snapshot; these queries read the version of a page updated by the latest transaction committed before $t_{pqs}$.

When the associated active query list becomes empty, a query snapshot is automatically advanced in real time without the requirement of quiescence of either ongoing transactions or queries. In other words, when all active queries accessing a query snapshot are finished, the query snapshot is advanced immediately. Query-snapshot advance (QS-advance) allows queries initiated in the future to read a more up-to-date database. For simplifying the presentation, we first present the query snapshot advance due to QL$_{pqs}$ becoming empty.

When a QS-advance is initiated, the original current query snapshot becomes the new previous query snapshot, and the new current query snapshot advances to the then most up-to-date, transaction-consistent database snapshot. The following updates to pertinent data structures, which are maintained in memory, accomplish such a QS-advance:

QL$_{pqs}$⊖QL$_{cqs}$;   AcTL$_{pqs}$⊖AcTL$_{cqs}$;   $t_{pqs}$⊖$t_{cqs}$;
QL$_{cqs}$⊖φ; AcTL$_{cqs}$⊖AcTL$_{cur}$; $t_{cqs}$⊖current time.

Notice that the manipulation of these data structures is done in memory and is rapidly accomplished.

Figure 2:
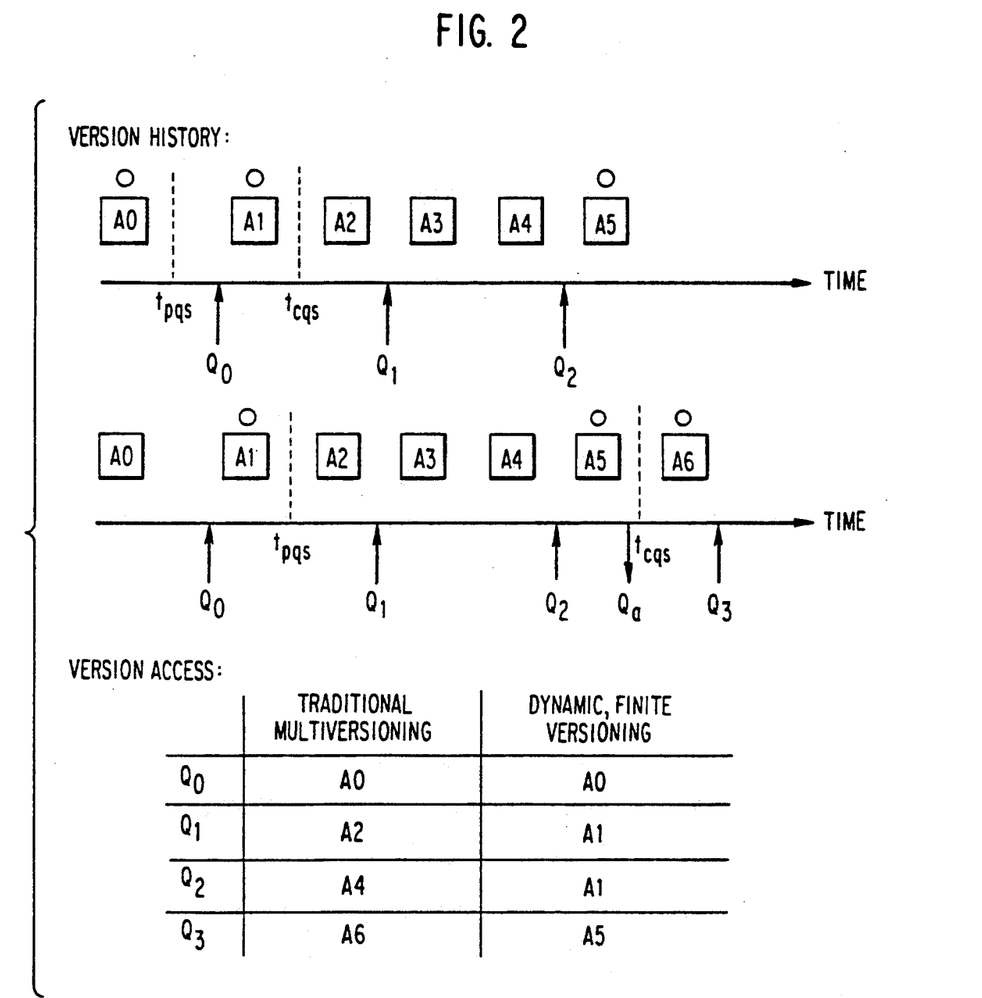
FIG. 2 is a diagram showing a query-snapshot-advance scenario and version access which contrasts the invention with traditional multiversioning schemes.

As an example, FIG. 2 shows a scenario for a query-snapshot advance when QL$_{pqs}$ becomes empty, and the version pages that various queries will access, as compared with traditional multiversioning approaches. A QS-advance (query-snapshot advance) is automatically initiated at the instant when query Q$_0$ completes. Compared with traditional multiversioning schemes in which the entire version history has to be maintained for potential query accesses, the dynamic, finite versioning scheme of this invention only keeps a finite number of versions (those marked with a circle in FIG. 2) and allows query snapshots to advance automatically. The trade-off is that in our dynamic, finite versioning, queries will read a slightly out-of-date, but transaction-consistent, database state. As shown in FIG. 2, queries Q$_1$ and Q$_2$ will both read page version A1 in the dynamic, finite versioning approach, as compared with page versions A2 and A4, respectively, in traditional multiversioning approaches.

Because of continuous QS-advances and transaction updates, the version that a page copy represents changes dynamically and continually. There are five possible versions that a page copy may represent: W, NQ, CQ, PQ and R. W represents the working version; i.e., the page that has been updated by an uncommitted transaction. CQ is the current-query version; it is the version updated by the latest transaction committed before $t_{cqs}$. NQ is the next-query version; it is the most recently committed version. When a transaction is committed, all the W versions that it has created become NQ. PQ is the previous-query version; it is the version updated by the latest transaction committed before $t_{pqs}$. R is an obsolete and therefore reusable version; it can be overwritten by a new transaction update. Notice that W, NQ, CQ, PQ, and R are invisible labels. The only auxiliary information maintained about a page copy is a time stamp and a transaction identifier which are recorded when the page copy is created. After its creation, there is no requirement of revisit to the page copy. In other words, version transitions are implicit, and no explicit re-labeling is required.

At any given instant, for any database page, there exist at least three logical versions: CQ, NQ and PQ. However, a single physical page copy may simultaneously represent multiple logical versions, such as (PQ, CQ), (CQ, NQ), or (PQ, CQ, NQ). The exact version(s) that a page represents changes dynamically and implicitly when (a) a transaction updates the page, (b) the updating transaction is committed, and (c) query snapshots advance. The rules for version transitions are presented in the following.

VT 1: On a transaction write ($T_x$-write), the new data are written into the W version, if there already exists a W; otherwise, the new data are written into the most recently updated R version. In both cases, the updated version becomes new W.

Figure 3:
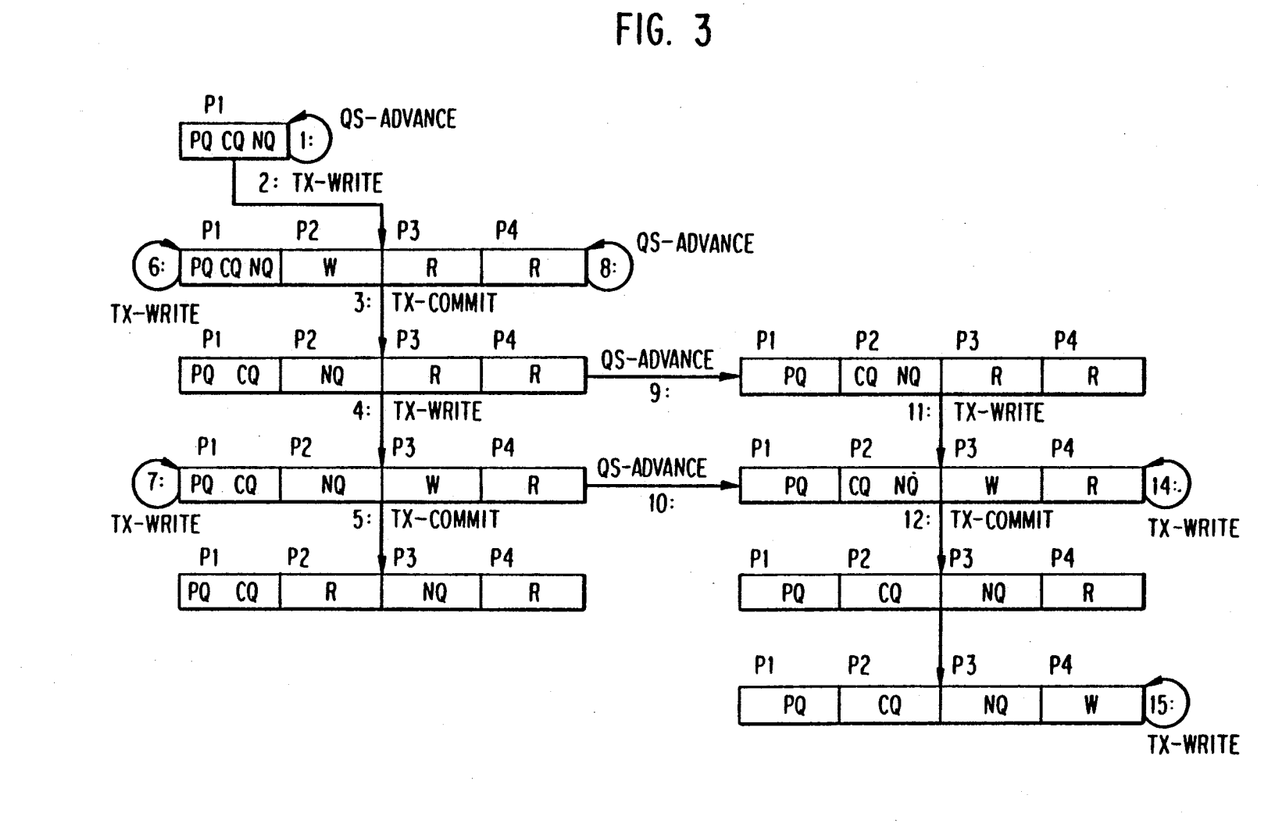
FIG. 3 is a diagram showing some version transitions for a page from an initial state.

VT 2: On a transaction commit ($T_x$-commit), W becomes NQ, and the original NQ becomes R, if it is singly represented by a page copy. As an example, FIG. 3 shows some version transitions for a logical page from the initial state (For space limitation, we do not demonstrate the entire version transitions for the page.). Transitions 3, 5 and 12 in FIG. 3 demonstrate the scenarios for version transitions on a $T_x$-commit. Transition 3 shows page copy P2 becomes NQ from W, while page copy P1 changes from (PQ, CQ, NQ) to (PQ, CQ). Transition 5 shows page copy P2 changes from NQ to R, because P2 originally represents only NQ.

Figure 4:
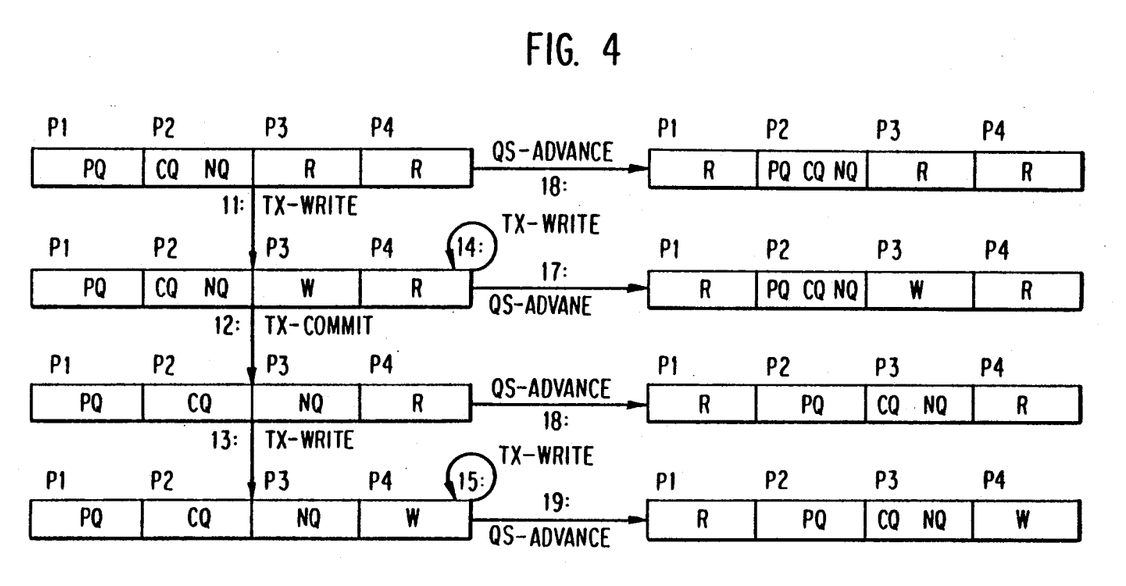
FIG. 4 is a diagram similar to FIG. 3 showing more version transitions.

VT 3: On a QS-advance due to the fact that $QL_{pqs}$ becomes empty, the current query snapshot becomes the previous query snapshot and the new current query snapshot is advanced by taking a snapshot of the most recently committed page versions. Version transitions for such a QS-advance include: (i) the original PQ becomes R, if it is singly represented by a page copy (see transitions 16–19 in FIG. 4); (ii) the original CQ becomes PQ, if it is singly represented by a page copy (see transitions 18 and 19 in FIG. 4); and (iii) the original NQ becomes also CQ, if it is singly represented by a page copy (see transitions 9 and 10 in FIG. 3 and transitions 18 and 19 in FIG. 4). From FIGS. 3 and 4, CQ and NQ are represented by the same page copy after the QS-advance. Transitions 1 and 8 in FIG. 3 demonstrate that nothing happens when PQ, CQ, and NQ are all represented by a single page copy.

The implicit version transition and the automatic query snapshot advancement are made possible by dynamically identifying correct versions for transaction and query accesses. The basic idea is to compare the invariant, maintained on each page copy, with the variant, stored in memory, to recognize the version that a page represents.

Figure 5:
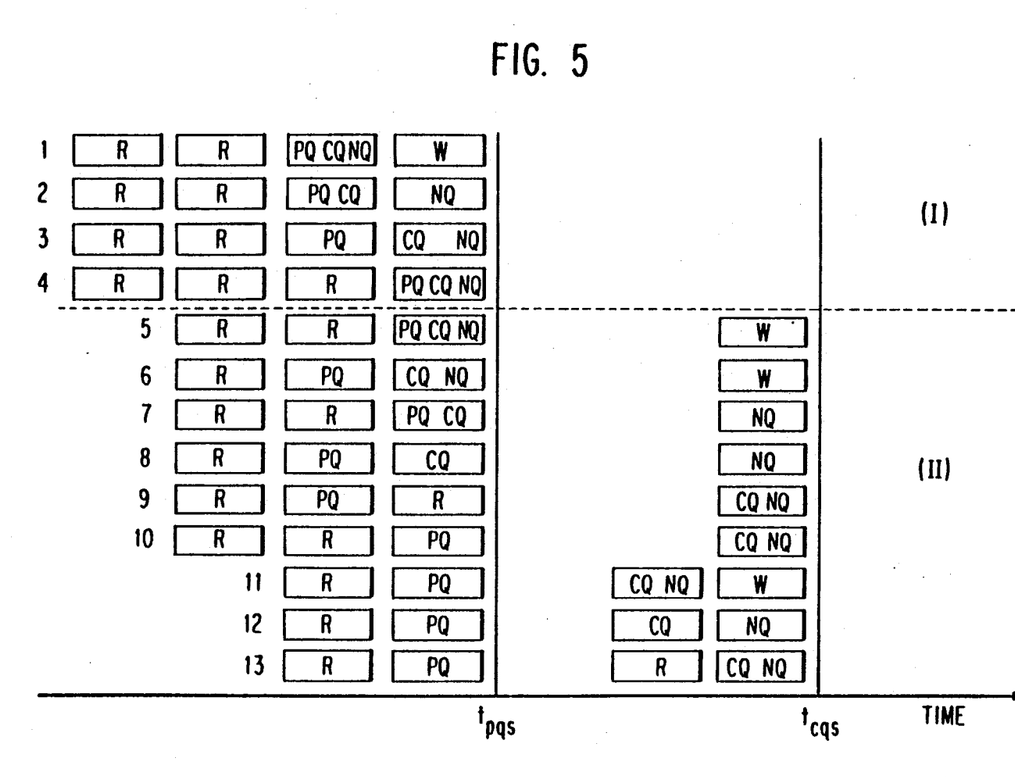
FIG. 5 is a diagram showing version configurations, grouped as categories (I) and (II)
Figure 6:
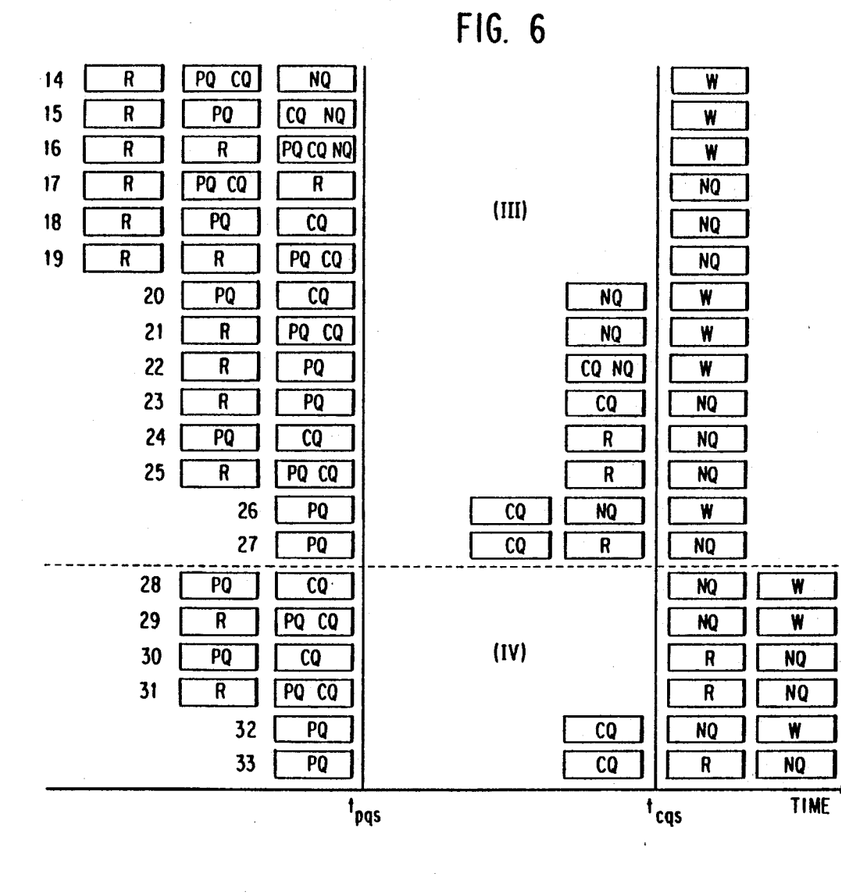
FIG. 6 is a diagram showing version configurations, grouped as categories (III) and (IV)

As an example to demonstrate the dynamic version identification, FIGS. 5 and 6 illustrate all possible version configurations with respect to $t_{cqs}$ and $t_{pqs}$. Depending on the commit time of a version, there are multiple cases in each category. Category (I) shows all version configurations when the most recent version was updated before $t_{pqs}$; category (II) shows all version configurations when the most recent version was updated before $t_{cqs}$; category (III) illustrates all version configurations when there is only a version that was updated after $t_{cqs}$; and category (IV) illustrates all version configurations when there are two versions that were updated after $t_{cqs}$. In category (I) in FIG. 5, assuming $T = tid[P_0]$, the transaction that created the most recent version, if transaction T is still not committed at the current moment, as indicated by $T \in AcTL_{cur}$, then the version configuration is case 1; if transaction T was committed after $t_{cqs}$, as indicated by $T \notin AcTL_{cur}$, but $T \in AcTL_{cqs}$, then it is case 2; if transaction T was committed between $t_{pqs}$ and $t_{cqs}$, as indicated by $T \notin AcTL_{cur}$, $T \notin AcTL_{cqs}$, and $T \in AcTL_{pqs}$, then it is case 3; if transaction T was committed before $t_{pqs}$, as indicated by $T \notin AcTL_{cur}$, $T \notin AcTL_{cqs}$, and $T \notin AcTL_{pqs}$, then it is case 4.

In the following, pseudocode for the routines that identify correct versions for transaction reads, query reads and transaction writes are presented.

Transaction read: A transaction read ($T_x$-read) gets the most recently updated version. Notice that the most recently updated version may not be the most recently committed version; it may still be a working version, and it is re-read by the same transaction that performed the most recent update.

Query read: The CQ or PQ version is returned on a query read (Q-read), according to the initiation timestamp of the query. A CQ is returned when the time stamp of the requesting query is greater than $t_{cqs}$. On the other hand, the PQ version is returned when the time stamp of the requesting query is greater than $t_{pqs}$ but less than $t_{cqs}$. Routine Locate__CQ returns the page copy representing the CQ version, and routine Locate__PQ, likewise, returns the page copy representing the PQ version.

Figure 7:
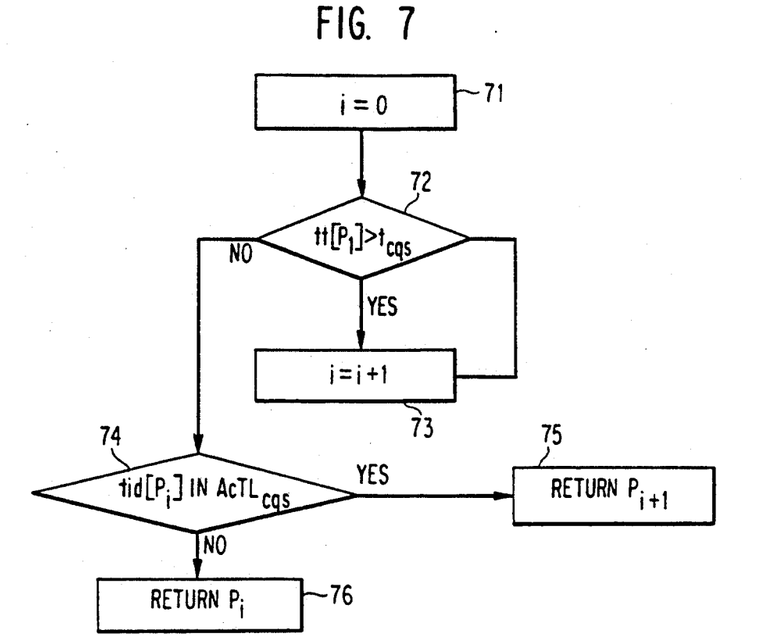
FIG. 7 is a flow diagram showing the logic of the routine Locate_CQ.

With reference to FIG. 7, there is shown a flow diagram of the logic of the routine Locate__CQ. The process begins by initializing the i register to 0 in function block 71. Then the time-stamp array $tt[P_i]$ is compared in decision block 72 with time $t_{cqs}$. As long as the time-stamp array $tt[P_i]$ is greater than time $t_{cqs}$, the i register is incremented by one in function block 73 and the process loops back to decision block 72. However, when the time-stamp array $tt[P_i]$ becomes equal to or less than time $t_{cqs}$, the process goes to decision block 74 where a test is made to determine if the transaction-identifier array $tid[P_i]$ is in ($\in$) the active transaction list $AcTL_{cqs}$. If so, a return of version $P_i$ is made in function block 75; otherwise, a return of version $P_i$ is made in function block 76.

The following pseudocode implements the logic of the flow diagram of FIG. 7. Source code in any suitable computer language can be written from the pseudocode for a specific application.

---

Routine Locate__CQ:
i = 0;
while ($tt[P_i] > t_{cqs}$)
   i = i + 1;
if ($tid[P_i] \in AcTL_{cqs}$)
   return version $P_{i+1}$;
else return version $P_i$;

---

Figure 8:
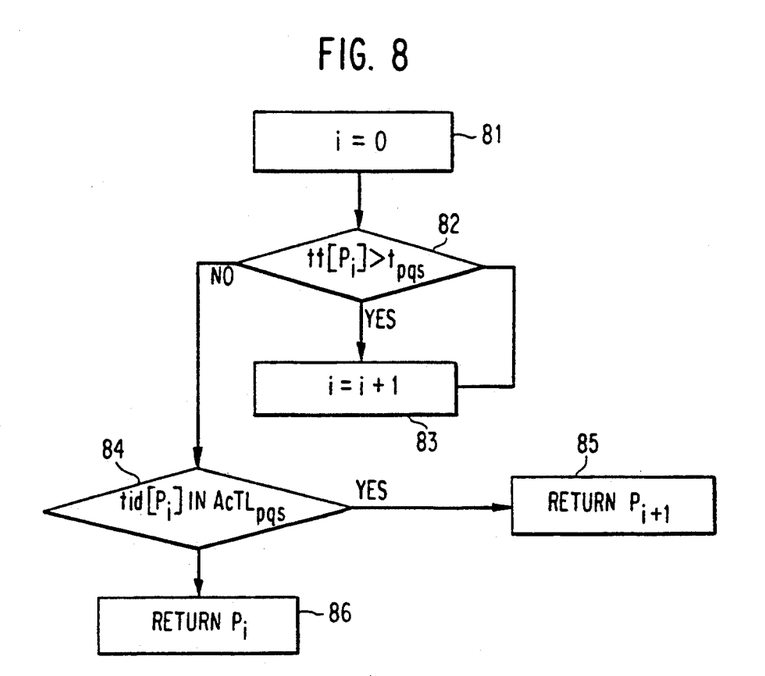
FIG. 8 is a flow diagram showing the logic of the routine Locate_PQ.

With reference to FIG. 8, there is shown a flow diagram of the logic of the routine Locate__PQ. The process begins by initializing the i register to 0 in function block 81. Then the time-stamp array $tt[P_i]$ is compared in decision block 82 with time $t_{pqs}$. As long as the time-stamp array $tt[P_i]$ is greater than time $t_{pqs}$, the i register is incremented by one in function block 83 and the process loops back to decision block 82. However, when the time-stamp array $tt[P_i]$ becomes equal to or less than time $t_{pqs}$, the process goes to decision block 84 where a test is made to determine if the transaction-identifier array $tid[P_i]$ is in ($\in$) the active transaction list AcTL$_{pqs}$. If so, a return of version P$_{i+1}$ is made in function block 85; otherwise, a return of version P$_i$ is made in function block 86.

The following pseudocode implements the logic of the flow diagram of FIG. 8. Source code in any suitable computer language can be written from the pseudocode for a specific application.

```
Routine Locate_PQ:
    i = 0;
    while (tt[P_i] > t_pqs)
        i = i + 1;
    if (tid[P_i] ∈ AcTL_pqs)
        return version P_{i+1};
    else return version P_i;
```

Notice that when a transaction is committed, its identifier is deleted only from AcTL$_{cur}$. As a result, at a given time a page copy may have become an NQ version with respect to the current database, but may still represent a working version with respect to a query snapshot. With the maintenance of AcTL$_{cqs}$ and AcTL$_{pqs}$, a working version at the time a snapshot was taken can be correctly recognized.

Figure 9:
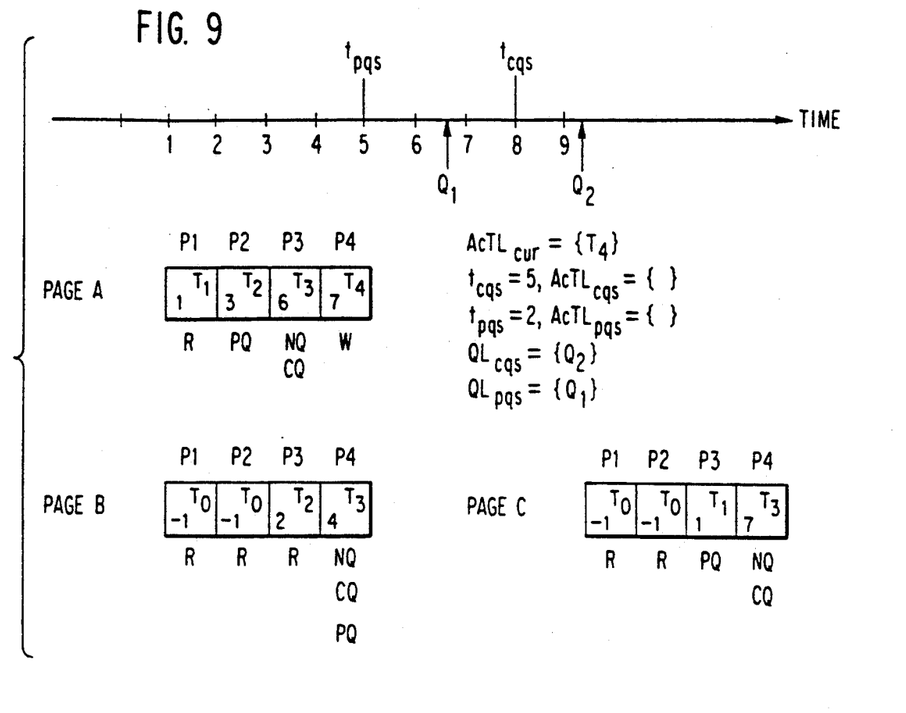
FIG. 9 is a diagram illustrating the process of version identification using routines Locate_CQ and Locate_PQ.

FIG. 9 shows an example of using time stamps and transaction identifiers for dynamic version identification by Locate_CQ and Locate_PQ. Two queries are active: Q$_1$ and Q$_2$. Q$_1$, started between t$_{pqs}$ and t$_{cqs}$, will access the PQ version; and Q$_2$, started after t$_{cqs}$, will access the CQ version. Notice that the only data structures maintained with each page copy are a transaction identifier, tid, and a time stamp, tt. When page A is referenced by query Q$_2$, page copy P3, the CQ version, is returned by Locate_CQ because its time stamp is the largest time stamp that is less than t$_{cqs}$ and its tid is not in AcTL$_{cqs}$. When page B is referenced by queries Q$_1$ and Q$_2$, page copy P4 is returned by both Locate_CQ and Locate_PQ because it represents simultaneously the CQ and PQ versions of page B.

Transaction write: The policy for a T$_x$-write is to write into the W version, if there is a W; otherwise, write into the most recently updated R version. The CQ, PQ, and NQ versions are kept intact, making possible noninterfering, concurrent transaction and query processing. Routine Locate_WR locates the W version, if there exists one, otherwise the most recently updated R, which is created either between NQ and CQ, or between CQ and PQ.

Figure 10:
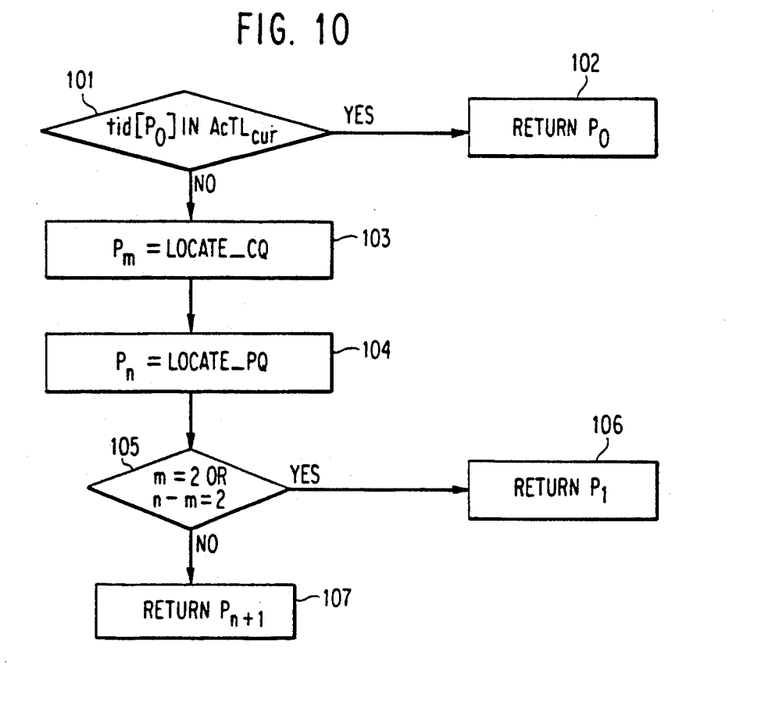
FIG. 10 is a flow diagram showing the logic of the routine Locate_WR.

With reference to FIG. 10, there is shown a flow diagram of the logic of the routine Locate_WR. The process begins in decision block 101 by determining whether the transaction-identifier array tid[P$_0$] is in (∈) the active transaction list AcTL$_{cur}$. If so, a return of version P$_0$ in function block 102; otherwise, a call is made to routine Locate_CQ for version P$_m$ in function block 103 followed by a call to routine Locate_PQ for version P$_n$ in function block 104. Next, a test is made in decision block 105 to determine if m=2 or if n-m=2. If either of these conditions are satisfied, a return of version P$_1$ is made in function block 106; otherwise, a return of version P$_n$ is made in function block 107.

The following pseudocode implements the logic of the flow diagram of FIG. 10. Source code in any suitable computer language can be written from the pseudocode for a specific application.

```
Routine Locate_WR:
if (tid[P_0] ∈ AcTL_cur)
        return version P_0;
else {
        P_m = Locate_CQ;
        P_n = Locate_PQ;
        if (m = 2 or (n-m = 2))
                return version P_1;
        else return version P_{n+1};
}
```

When the most recently updated version is the NQ version of a page, and it was created before t$_{pqs}$, then the PQ, CQ and NQ are all represented by a single page copy. The other three pages can be garbage collected. To preserve the sequentiality of the database, the combined PQ, CQ and NQ version is copied back to the initially allocated page, and the three contiguous physical pages are set free. Garbage collection can be done whenever a read operation by a transaction or a query detects such a condition, or it can be done whenever a T$_x$-write needs three additional pages.

The current query snapshot can be advanced once there are no active queries accessing the current query snapshot. As a result, the upcoming queries can access a more up-to-date database state. When a new query arrives and there is no other active query accessing the current query snapshot, a new current query snapshot is taken. To advance such a query snapshot, AcTL$_{cqs}$ is assigned AcTL$_{cur}$ and t$_{cqs}$ is assigned with the current time. The rule for version transition on such a QS-advance is as follows.

VT 3': The original CQ becomes R, if it is singly represented by a page copy, and the original NQ becomes also CQ.

When a QS-advance can be initiated because either QL$_{pqs}$ or QL$_{cqs}$ becomes empty, routines Locate_CQ and Locate_PQ are still the same, but routine Locate_WR needs a slight modification.

```
Routine Locate_WR':
if (tid[P_0] ∈ AcTL_cur)
        return version P_0;
else {
        P_m = Locate_CQ;
        P_n = Locate_PQ;
        if (n = 3 and (n-m = 2))
                return version P_2;
        else if (m = 2 or (n-m ≧ 2))
                return version P_1;
        else return version P_{n+1};
}
```

Notice that when there is no active query in the system, no query version is required. When a query finally arrives after no query is active in the system for a period of time, a query snapshot can be taken immediately of the most recently committed version, and the newly arriving query can access that new query snapshot.

The dynamic 4-versioning scheme described above is generalizable to more than four versions, where more than two query versions are maintained. For example, three query versions can be maintained in a dynamic 5-versioning scheme. With more query versions, on the average, the frequency of a query snapshot advancement is increased. And therefore, queries will read more up-to-date database states.

When the maximum number of versions maintained for each logical page is three, the dynamic, finite versioning approach described above is still applicable, but with a more restricted functionality. The dynamic 3-versioning alternative is to use only one query version; namely, there are no PQ versions and only CQ, NQ, W and R versions exist. As a result, a query snapshot cannot be advanced when there are still active queries in the system. Updates by uncommitted transactions are still allowed to be written into the database at any instance.

Since a query snapshot is allowed to advance only when the associated active query list is empty, a long-running query may cause upcoming queries to read from a much more obsolete database state. To improve the up-to-dateness of upcoming query accesses, we present an approach in which a long-running query can be deliberately assigned a time stamp that is less than $t_{cqs}$ when it is started, and be forced to access the previous query snapshot. The current query snapshot, as a result, can be advanced more frequently. If there are more than two query versions, such as three query versions, then the long-running queries can be forced to access the oldest query version and the more recent two versions can be advanced regularly. Such an approach, forcing long-running queries to access the older version, requires the transaction manager to be informed in advance that whether or not a query is long-running.

While the invention has been described in terms of a single preferred embodiment with possible modifications, those skilled in the art will recognize that the invention can be practiced with modification within the spirit and scope of the appended claims.

Having thus described our invention, what we claim as new and desire to secure by Letters Patent is as follows:

1. In a data processing system supporting concurrent transaction and query processing of a database, a method performed by said data processing system for accessing said database in which there is no interference between transactions and queries and no quiescence of either transactions or queries for allowing queries to access a more up-to-date version of said database, wherein the logical versions that a physical page copy represents change implicitly over time said method comprising the steps of:
   dynamically maintaining a plurality of finite logical versions of each page in said database and allowing for a physical page copy to represent simultaneously a plurality of logical versions of a page;
   maintaining time-invariant information, including a time-stamp and a transaction identifier, with each physical page copy when it is created, said time-stamp recording a time at which a physical page is updated by a transaction and said transaction identifier recording an identifier of a transaction last updating the physical page;
   maintaining, in memory, time-varying information which represents a system state, including a time-stamp of a current query snapshot time, a transaction list recording active transactions at a time when said current query snapshot was taken, and a transaction list recording active transactions currently in progress;
   using said time-varying information to generate a transaction-consistent query snapshot of said database for accesses by queries without quiescing either transaction or query processing, a query snapshot being identified by a time-stamp and an active transaction list at a time when said snapshot was taken; and
   using said time-invariant information kept with each physical page copy and said time-varying information maintained in memory to dynamically identify appropriate version pages of said database for transaction and query accesses to avoid transaction and query interference.

2. The method of claim 1 further comprising the step of recognizing logical versions a physical page represents through dynamic version identification.

3. The method of claim 2 wherein the time-variant version state of a page a query or transaction should read or update is determined by the steps of:
   permitting access of a most recent version pages of said database by a transaction;
   maintaining most recently committed version pages of said database as a result of writing to said database by said transaction;
   maintaining a current query snapshot of said database from said most recently committed version of said database for access by queries;
   accessing said current query snapshot of said database by queries; and
   automatically advancing said current query snapshot of said database to said most recently committed version pages of said database without relabelling a plurality of versions of said pages.

4. The method of claim 3 further comprising the step of maintaining an active query list of said queries, an identifier for a query being deleted from said active query list when a query is completed, said step of dynamically advancing said current query snapshot of said database to said most recently committed version of said database being performed when said active query list is empty.

5. The method of claim 3 further comprising the steps of:
   generating a previous query snapshot of said database from said current query snapshot for access by queries occurring prior to the generation of a next version of said current query snapshot as a result of dynamically advancing said current query snapshot to said most recently committed version of said database; and
   automatically advancing said previous query snapshot of said database to said current query snapshot of said database when no active query is accessing said previous query snapshot.

6. The method of claim 5 wherein said previous query snapshot, said current query snapshot and said most recently committed version may be the same physical pages but are different logical pages.

7. The method of claim 4 further comprising the steps of:
   maintaining a current active query list of said queries, an identifier for a query being deleted from said active query list when a query is completed, said step of dynamically advancing said current query snapshot of said database to said most recently committed version of said database being performed when said current active query list is empty; and
   maintaining a previous active query list of queries occurring prior to the generation of said current query snapshot of said database, an identifier for a query being deleted from said previous active query list when a query is completed, said step of dynamically advancing said previous query snapshot of said database to said current query snapshot of said database being performed when said previous active query list is empty.

8. The method of claim 3 further comprising the step of generating a working version of said database to which changes made by said transaction are written prior to being committed, said most recently committed version of said database being derived from said working version at a time when said changes are committed.

9. The method of claim 3 further comprising the steps of:
generating a working version of said database to which changes made by said transaction are written prior to being committed, said most recently committed version of said database being derived from said working version at a time when said changes are committed;
generating a previous query snapshot of said database from said current query snapshot for access by queries occurring prior to the generation of a next version of said current query snapshot as a result of dynamically advancing said current query snapshot to said most recently committed version of said database; and
dynamically advancing said pervious query snapshot of said database to said current query snapshot of said database when no active query is accessing said previous query snapshot.

10. The method of claim 9 further comprising the steps of:
maintaining a current active query list of said queries, an identifier for a query being deleted from said active query list when a query is completed, said step of dynamically advancing said current query snapshot of said database to said most recently committed version of said database being performed when said current active query list is empty; and
maintaining a previous active query list of queries occurring prior to the generation of said current query snapshot of said database, an identifier for a query being deleted from said previous active query list when a query is completed, said step of dynamically advancing said pervious query snapshot of said database to said current query snapshot of said database being performed when said previous active query list is empty.

11. The method of claim 10 wherein said database is stored on a direct access storage device, said method further comprising the step of dynamically allocating and deallocating storage space on said direct access storage device for said versions of said database in such a manner that a single physical page copy may simultaneously represent multiple logical versions of said database, said storage space being dynamically expanded into up to four page copies when necessary.

12. The method recited in claim 11 wherein, without acquiring any locks, queries access an appropriate query version according to initiation times of said queries.

13. The method recited in claim 11 wherein said step of dynamically allocating and deallocating storage space always logically maintains a current query version of said database, a previous query version of said database and a most recently committed version of said database although a single physical page copy may simultaneously represent said multiple logical versions of said database, further comprising the step of overwriting an old query version of said database when a new transaction update is written to said database.

14. The method recited in claim 11 wherein exact logical versions that a physical page copy on said direct access storage device represents changes dynamically and implicitly when a new transaction update is written into said database, an active transaction is committed and a new snapshot of said database is taken for access by queries, correct logical versions of a page copy being dynamically identified when a page is referenced and no explicit action to a page copy being required during a version change.

15. The method recited in claim 11 further comprising the step of storing only time-invariant information on said direct access storage device when a page copy is created while maintaining said variant information in memory.

16. The method recited in claim 15 wherein said time-variant information is the system state, including database snapshot times, and active transactions and queries at the snapshot times and currently in progress.

17. The method recited in claim 11 further comprising the step of on-the-fly garbage collection when, during a normal read access of a page stored on said direct access storage device, a single physical copy is found to be sufficient to represent required logical versions of said database.

18. A data processing system supporting concurrent transaction and query processing of a database comprising:
direct access storage means for storing physical copies of said database;
plurality of terminal means for concurrently accessing said database for transactions and queries; and
processor means connected to said plurality of terminal means and said direct access storage means for managing said transactions and queries using a dynamic, finite versioning scheme for accessing said database in which there is no interference between transactions and queries and no quiescence of either transactions or queries for allowing queries to access a more up-to-date version of said database wherein the logical versions that a physical page represents change implicitly over time, said processor means including one or more central processor units and memory means for storing information;
said processor means dynamically maintaining a plurality of finite logical versions of each page in said database and allowing for a physical page copy to represent simultaneously a plurality of logical versions of a page;
said direct access storage means recording time-invariant information, including a time-stamp and a transaction identifier, with each physical page copy when it is created, said time stamp recording a time at which a physical page is updated by a transaction and said transaction identifier recording an identifier of a transaction last updating the physical page;
said memory means maintaining time-varying information which represents a system state, including a time-stamp of a current query snapshot time, a transaction list recording active transactions at a time when said current query snapshot was taken, and a transaction list recording active transactions currently still in progress;

said processor means using said time-varying information to generate a transaction-consistent query snapshot of said database for accesses by queries without quiescing either transaction or query processing, a query snapshot being identified by a time-stamp and an active transaction list at a time when the snapshot was taken;

said processor means further using said time-invariant information kept with each physical page copy and said time-varying information in memory to dynamically identify appropriate version pages of said database for transaction and query accesses to avoid transaction and query interference.

19. The data processing system of claim 18 wherein said processor means recognizes logical versions that a physical page represents through dynamic version identification.

20. The data processing system recited in claim 19 wherein said processor means comprises:

database version manager means for generating a most recently committed version of said database as a result of writing to said database by said transaction and generating a current query snapshot of said database from said most recently committed version of said database for access by queries, said database version manager dynamically advancing said current query snapshot of said database to said most recently committed version of said database; and database management means for permitting access of a current version of said database by a transaction and for accessing said current query snapshot of said database by queries.

21. The data processing system recited in claim 20 wherein said database version manager means maintains an active query list of said queries, said database version manager deleting an identifier for a query from said active query list when a query is completed, said database version manager dynamically advancing said current query snapshot of said database to said most recently committed version of said database when said active query list.

22. The data processing system recited in claim 20 wherein said database version manager means further generates a previous query snapshot of said database from said current query snapshot for access by queries occurring prior to the generation of a next version of said current query snapshot as a result of dynamically advancing said current query snapshot to said most recently committed version of said database, and dynamically advances said previous query snapshot of said database to said current query snapshot of said database when no active query is accessing said previous query snapshot.

23. The data processing system recited in claim 22 wherein said database version manager means maintains a current active query list of said queries, said database version manager deleting an identifier for a query from said current active query list when a query is completed, said database version manager dynamically advancing said current query snapshot of said database to said most recently committed version of said database when said current active query list is empty, said database version manager means further maintains a previous active query list of queries occurring prior to the generation of said current query snapshot of said database, an identifier for a query being deleted from said previous active query list when a query is completed, said database version manager dynamically advancing said previous query snapshot of said database to said current query snapshot when said previous active query list is empty.

24. The data processing system recited in claim 20 wherein said database version manager means generates a working version of said database to which changes made by said transaction are written prior to being committed, said most recently committed version of said database being derived from said working version at a time when said changes are committed, generates a previous query snapshot of said database from said current query snapshot for access by queries occurring prior to the generation of a next version of said current query snapshot as a result of dynamically advancing said current query snapshot to said most recently committed version of said database, maintains a current active query list of said queries, said database version manager deleting an identifier for a query from said current active query list when a query is completed, said database version manager dynamically advancing said current query snapshot of said database to said most recently committed version of said database when said current active query list is empty, said database version manager means further maintains a previous active query list of queries occurring prior to the generation of said current query snapshot of said database, an identifier for a query being deleted from said previous active query list when a query is completed, and dynamically advances said pervious query snapshot of said database to said current query snapshot of said database when no active query is accessing said previous active query snapshot.

25. The data processing system recited in claim 24 further comprising means for dynamically allocating and deallocating storage space on said direct access storage device for said versions of said database in such a manner that a single physical page copy may simultaneously represent multiple logical versions of said database, said storage space being dynamically expanded into up to four page copies when necessary.

26. The data processing system recited in claim 25 wherein said means for dynamically allocating and deallocating storage space on said direct access storage means always logically maintains a current query version of said database, a previous query version of said database and a most recently committed version of said database although a single physical page copy on said direct access storage means may simultaneously represent said multiple logical versions of said database, said means for dynamically allocating and deallocating storage space further overwriting an old query version of said database on said direct access storage means when a new transaction update is written to said database.

27. The data processing system recited in claim 26 wherein exact logical versions that a physical page copy represents on said direct access storage means represents changes dynamically and implicitly made when a new transaction update is written into said database, an active transaction is committed and a new snapshot of said database is taken for access by queries, correct logical versions of a page copy being dynamically identified when a page is referenced and no explicit action to a page copy being required during a version change.

28. The data processing system recited in claim 26 wherein only said time-invariant information is stored on said direct access storage means when a page copy is created while maintaining said time variant information in memory.

* * * * *